(12) United States Patent
Dekker et al.

(10) Patent No.: US 10,311,202 B2
(45) Date of Patent: Jun. 4, 2019

(54) PROBABILISTIC LOAD AND DAMAGE MODELING FOR FATIGUE LIFE MANAGEMENT

(71) Applicant: AIRBUS HELICOPTERS DEUTSCHLAND GmbH, Donauworth (DE)

(72) Inventors: Sam Dekker, Amsterdam (NL); Georg Wurzel, Gersthofen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 513 days.

(21) Appl. No.: 15/095,313

(22) Filed: Apr. 11, 2016

(65) Prior Publication Data
US 2017/0293712 A1    Oct. 12, 2017

(51) Int. Cl.
| | | |
|---|---|---|
| *G06F 17/50* | (2006.01) | |
| *G06N 20/00* | (2019.01) | |
| *G06F 13/00* | (2006.01) | |

(52) U.S. Cl.
CPC ...... *G06F 17/5095* (2013.01); *G06F 17/5009* (2013.01); *G06N 20/00* (2019.01); *G06F 2217/10* (2013.01); *G06F 2217/76* (2013.01)

(58) Field of Classification Search
CPC ... G06N 7/005; G06N 99/005; G06F 17/5095
USPC .................................................. 703/2, 6, 8
See application file for complete search history.

(56) References Cited

U.S. PATENT DOCUMENTS

| | | | |
|---|---|---|---|
| 6,226,597 B1 | 5/2001 | Eastman et al. | |
| 6,480,792 B1 * | 11/2002 | Prendergast | G07C 3/00 702/42 |
| 7,532,988 B2 | 5/2009 | Khibnik et al. | |
| 8,200,442 B2 | 6/2012 | Adams et al. | |
| 8,571,814 B2 | 10/2013 | Zhao et al. | |
| 8,744,651 B2 | 6/2014 | Bates et al. | |
| 8,868,284 B2 | 10/2014 | Isom et al. | |

(Continued)

FOREIGN PATENT DOCUMENTS

| | | |
|---|---|---|
| DE | 4336588 | 5/1995 |
| EP | 2230638 | 9/2010 |

(Continued)

*Primary Examiner* — Thai Q Phan
(74) *Attorney, Agent, or Firm* — Brooks Kushman P.C.

(57) ABSTRACT

A fatigue life management system for determining a remaining fatigue life of a component of an aircraft. The fatigue life management system may generate probability density functions of minimum load, maximum load, and timeframe damage for predetermined time intervals based on selected flight data of the aircraft and regression models for probabilistic prediction of minimum load, maximum load, and timeframe damage of the component. The fatigue life management system may further compute an accumulated fatigue damage estimation based on the probability density functions and a probabilistic fatigue strength model. The fatigue life management system may then generate a distribution of the accumulated fatigue damage estimation of the component. If desired, the processing circuit may compare the distribution of the accumulated fatigue damage estimation with a reliability requirement to determine the remaining fatigue life of the component.

10 Claims, 6 Drawing Sheets

(56) References Cited

U.S. PATENT DOCUMENTS

| | | | |
|---|---|---|---|
| 2007/0198215 A1* | 8/2007 | Bonanni | G05B 23/0251 |
| | | | 702/183 |
| 2010/0235109 A1 | 9/2010 | Zhao et al. | |
| 2011/0057071 A1* | 3/2011 | Sahasrabudhe | G05D 1/0858 |
| | | | 244/17.13 |
| 2011/0112878 A1* | 5/2011 | Isom | G06Q 10/06311 |
| | | | 705/7.13 |
| 2011/0264310 A1* | 10/2011 | Bates | G07C 5/085 |
| | | | 701/14 |
| 2012/0101776 A1* | 4/2012 | Brower | B64D 43/00 |
| | | | 702/183 |
| 2012/0323410 A1* | 12/2012 | Bendisch | G01M 5/0033 |
| | | | 701/3 |
| 2017/0293712 A1* | 10/2017 | Dekker | G06F 17/5095 |

FOREIGN PATENT DOCUMENTS

| | | |
|---|---|---|
| EP | 2333726 | 6/2011 |
| EP | 2384971 | 11/2011 |
| EP | 1660958 | 4/2012 |
| EP | 2535692 | 12/2012 |
| EP | 2725337 | 4/2014 |
| WO | 9824042 | 6/1998 |
| WO | 0025272 | 5/2000 |

* cited by examiner

PROBABILISTIC LOAD AND DAMAGE MODELING FOR FATIGUE LIFE MANAGEMENT

BACKGROUND OF THE INVENTION

(1) Field of the Invention

The present embodiments relate to fatigue life management and, more particularly, to probabilistic load and damage modeling that determines an accumulated fatigue damage of a component and thereby improves the prediction of the remaining fatigue life of the component.

(2) Description of Related Art

Aircraft have a large number of structural components that are safety-critical and subject to intense structural usage, for example caused by operational loads. Under operational loads, these structural components may develop fatigue damage and ultimately fail. In general, such a component must be replaced before the probability of failure exceeds an acceptably low probability. However, these components are often expensive to replace.

Once in service, the actual loading and fatigue damage accumulation for a component may vary considerably between aircraft, depending on many factors, such as the types of missions flown, the environmental conditions, and pilot technique. According to the state-of-the-art, after an aircraft is sold to a customer, the original equipment manufacturer (OEM) assumes a single aircraft standard mission profile that is representative and conservative for all aircrafts sold to any customers. This assumed standard mission profile is then used to determine a fixed fatigue damage accumulation rate for all aircrafts sold. The assumed standard mission profile has to be conservative for all aircrafts.

Therefore, the assumed fatigue damage accumulation rate results in an early replacement of components (e.g., after a fixed number of flight hours on a given aircraft) relative to the actual consumed fatigue life of the components on the given aircraft. This can lead to unnecessary maintenance costs and reduced availability of the concerned aircraft due to more frequent maintenance, especially for users who use the aircraft lightly. However, if the aircraft were to be used more severely than the assumed standard mission profile, fatigue damage could accumulate at a higher rate than assumed according to the standard mission profile, thus leading to an increased risk of fatigue damage.

BRIEF SUMMARY OF THE INVENTION

A fatigue life management system for determining a remaining fatigue life of a component of an aircraft may include a processing circuit and first and second storage circuits. The first storage circuit may store selected flight data of the aircraft, and the second storage circuit may store regression models for probabilistic prediction of minimum load, maximum load, and timeframe damage of the component. The processing circuit may receive the selected flight data from the first storage circuit and the regression models from the second storage circuit, generate probability density functions of minimum load, maximum load, and timeframe damage for predetermined time intervals based on the selected flight data and the regression models, and compute an accumulated fatigue damage estimation based on the probability density functions and a probabilistic fatigue strength model to generate a distribution of the accumulated fatigue damage estimation of the component. If desired, the processing circuit may compare the distribution of the accumulated fatigue damage estimation with a reliability requirement to determine the remaining fatigue life of the component.

It is appreciated that the embodiments described herein can be implemented in numerous ways, such as a process, an apparatus, a system, a device, or a method executed on a processing machine. Several inventive embodiments of the present invention are described below.

In certain embodiments, the above mentioned fatigue life management system may include a flight data recorder and an additional processing circuit. The flight data recorder may generate flight data recordings during an operation of the aircraft. For example, a sensor that is coupled to the component may generate at least a subset of the flight data recordings. The additional processing circuit may process the selected flight data based on the flight data recordings and store the selected flight data in the first storage circuit during a write access operation.

If desired, the fatigue life management system may include a sensor bias modeling circuit that receives the selected flight data from the first storage circuit, models a random bias of the sensor based on a probabilistic flight data model, and uses the random bias of the sensor to generate a variant of the selected flight data.

In certain embodiments, the above-mentioned processing circuit may include a simulation circuit that implements a simulation method to compute the accumulated fatigue damage estimation.

Further features of the invention, its nature and various advantages, will be more apparent from the accompanying drawings and the following detailed description of the preferred embodiments.

DETAILED DESCRIPTION OF THE INVENTION

The present embodiments provided herein relate to fatigue life management and, more particularly, to probabilistic load and damage modeling that determines an accumulated fatigue damage of a component and thereby improves the prediction of the remaining fatigue life of the component.

A component in an aircraft may be subject to intense structural usage caused by operational loads. As a result, the component may accumulate fatigue damage which may ultimately lead to failure of the component. Therefore, such a component must be replaced before the probability of failure exceeds an acceptably low probability. However, after an aircraft is sold to a customer, the original equipment manufacturer (OEM) may assume a single aircraft standard mission profile that is representative and conservative for all aircrafts sold to any customers. This assumed standard mission profile is then used to determine a fixed fatigue damage accumulation rate for all aircrafts sold. Therefore, the assumed fatigue damage accumulation rate may result in an early replacement of components when users are using the aircraft below the assumed standard mission profile or to a late replacement of components when users are using the aircraft beyond the assumed standard mission profile.

Methods that address these problems have recently emerged. Some methods estimate in-flight loads and actually consumed fatigue life by statistical comparison between flight data and a reference data base that was collected by the original equipment manufacturer. However, these solutions often estimate the most-likely loads and the most-likely within-time-interval fatigue damage, thereby randomly under- and overestimating the actual values of extreme loads and timeframe damage. These estimation errors can have a significant influence on the overall reliability of the estimated accumulated fatigue damage.

For example, some methods make merely point estimates of extreme loads of selected flight regimes and impose pre-determined reliability factors that are based on the average usage of aircrafts in a fleet on these extreme loads, while others predict failure distributions of an aircraft component based on collected data from a fleet of aircrafts about in-service component failures. These methods have in common that the targeted reliability of a component of an individual aircraft depends exclusively on the average use of aircrafts in the fleet.

Other examples include methods that perform fatigue life monitoring by flight regime recognition which divides and classifies an individual flight into a sequence of discrete flight regimes that are based on a library containing a limited number of load cases. Other methods fully reconstruct the complete load signal, for example by means of non-linear statistical data modeling. These methods have in common that the amount of data and the quality of the data on which fatigue life monitoring is based only allows for an imprecise prediction of fatigue damage in aircraft components.

Therefore, it may be desirable that a fatigue life management system bases the estimated accumulated fatigue damage of a component on data obtained from the individual analysis of regular flight data. For example, such a fatigue life management system may base the estimated accumulated fatigue damage of the component on the direct recognition of the maximum and minimum loads and the induced damage within each timeframe of usage of the corresponding component. Thus, the fatigue life management system may achieve the same level of reliability and prevention of component failure in individual aircrafts in accordance with a maximum acceptable probability of failure of the component with a required level of confidence.

Such a fatigue life management system may explicitly account for modeling and estimation errors and can therefore meet the most stringent airworthiness requirements. Furthermore, such a fatigue life management system may monitor the individual fatigue life usage of the component. For example, the fatigue life management system may allow an increase of the flight-hour-based interval between component replacements and thereby reduce the direct operating costs of the aircraft if component usage is less severe than conservatively assumed by the original equipment manufacturer. In another example, the fatigue life management system may shorten the interval between component replacements and thereby prevent increased risk of fatigue failure of the component if component usage is more severe than conservatively assumed by the original equipment manufacturer.

It will be recognized by one skilled in the art, that the present exemplary embodiments may be practiced without some or all of these specific details. In other instances, well-known operations have not been described in detail in order not to unnecessarily obscure the present embodiments.

Figure 1:
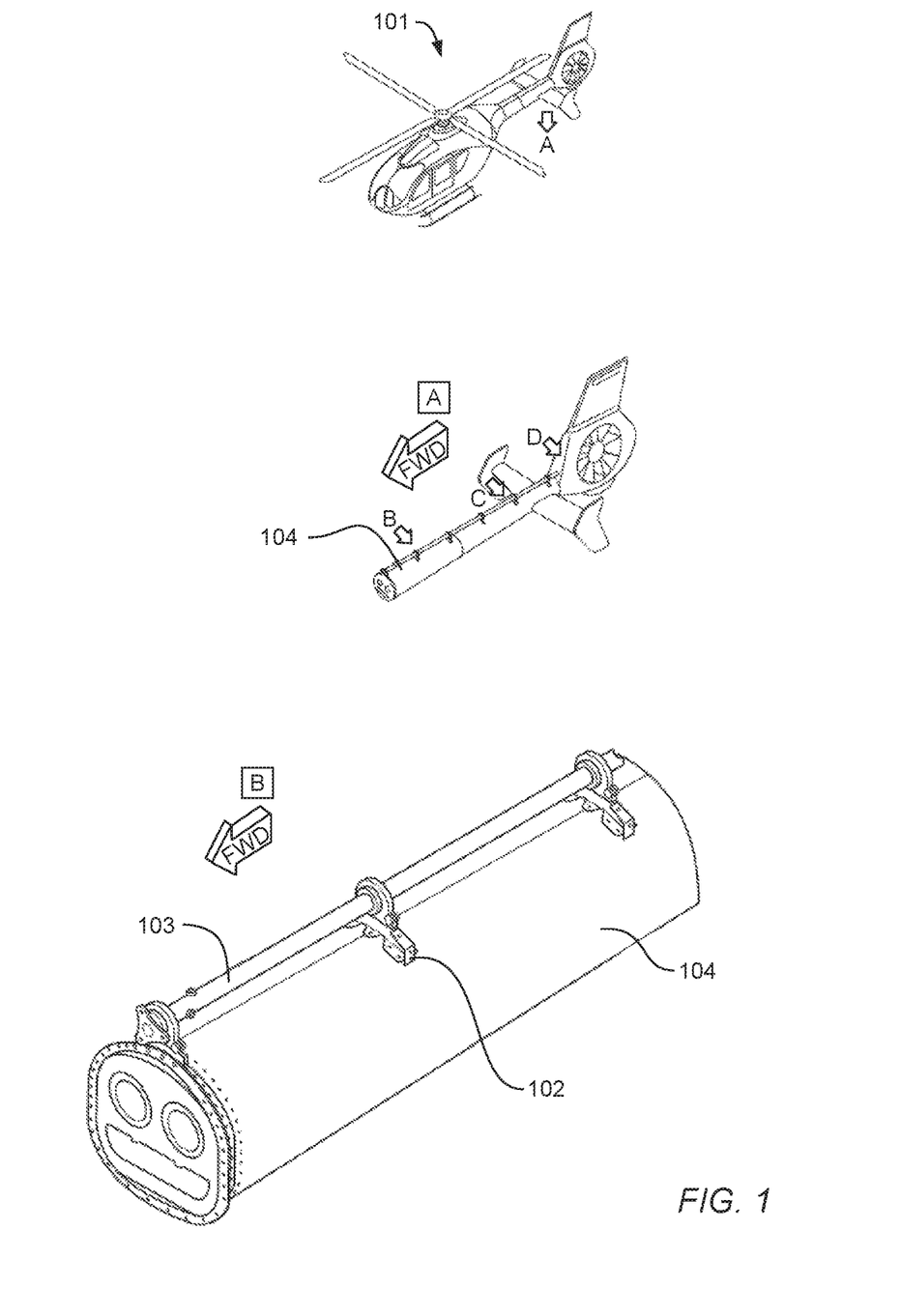
FIG. 1 is a diagram of an illustrative classification helicopter used for load measurements and the helicopter's driveshaft instrumented for load measurement in accordance with an embodiment.
Figure 2:
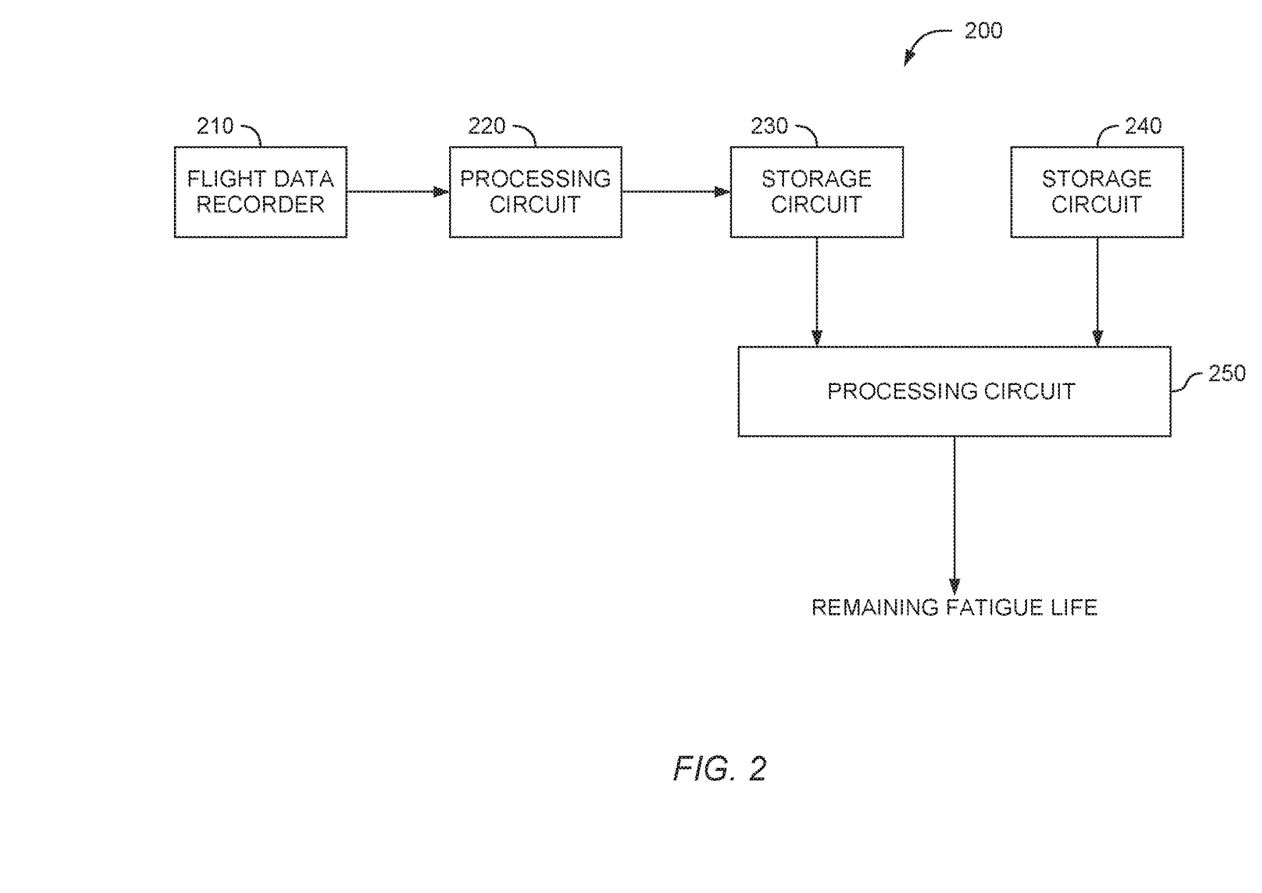
FIG. 2 is a diagram of an illustrative fatigue life management system for determining a remaining fatigue life of a component of an aircraft in accordance with an embodiment.

An illustrative aircraft (e.g., classification helicopter 101) with measurement and recording equipment in accordance with an embodiment is shown in FIG. 1. As shown in FIG. 1, classification helicopter 101 may be equipped with measurement and recording equipment 102 for classification flights that measure and record flight data (e.g., for a fatigue life management system as shown in FIG. 2). The component that is observed by measurement and recording equipment 102 may be a tail rotor drive shaft 103 of a tail boom 104 of classification helicopter 101, as an example.

Measurement and recording equipment 102 may sample flight data at a comparatively high frequency (e.g., at a frequency of at least 75 Hz). If desired, the recorded flight data may include load signals that are induced by the usage of classification helicopter 101 at components of the classification helicopter 101.

As an example, measurement and recording equipment 102 may include sensors that measure strain or load (e.g., strain gauges) that may accurately measure the torque on the tail rotor drive shaft 103 at a predetermined, comparatively high sampling rate (e.g., at least 75 Hz) during operation of classification helicopter 101 (e.g., during classification flights). The measured data may be stored in a separate storage device. Alternatively, the measured data may be stored in a flight data recorder, if desired.

For the classification flights, classification helicopter 101 may fly a series of maneuvers with varying configurations (e.g., different weight, center of gravity, atmospheric pressure, etc.). The series of maneuvers may together be representative for an assumed and conservative Standard Mission Profile. If desired, the flown maneuvers may include all the flight states included in the Standard Mission Profile. During these maneuvers of the classification flights, the aircraft flight parameters may be measured and recorded at the same comparatively high frequency as the load signals and, if desired, synchronous in time to the load signal recordings.

For example, the recorded parameters may include the classification helicopter's angle of attack, yaw rate, roll rate, pitch rate, roll attitude, pitch attitude, vertical acceleration, engine torque, collective position, rotor revolutions per minute, etc. The recorded parameters may be read out from an on-board Avionics System (not shown) as flight data presented as a dataset from the classification flights.

In some embodiments, the classification flights may generate a dataset with flight data (e.g., as represented by the graph shown in FIG. 3) that may be stored in the flight data recorder and include time synchronous recordings at a comparatively high frequency of the load signals, such as the load signals at the tail rotor drive shaft 103, with the corresponding aircraft flight parameters that are representative for the defined Standard Mission Profile.

The dataset may include structured sets of coefficients that take into account the interaction of detected loads at components of classification helicopter 101. If desired, a processing circuit may generate a database of probabilistic prediction models for timeframe maximum load, minimum load, and timeframe damage from the dataset.

As an example, a high frequency load spectrum and a low frequency load spectrum may model total fatigue damage of the component. The low frequency load spectrum may be determined by the maximum and minimum loads within a sequence of timeframes, and the high frequency load spectrum may be determined based on the summation of the load spectra of all individual timeframes.

The processing circuit that generates the database of probabilistic prediction models may implement a relevance vector machine (i.e., a machine learning technique that uses Bayesian inference to obtain parsimonious solutions for regression and probabilistic classification) and/or an artificial neural network (e.g., a back-propagation artificial neural network with a configuration that includes two hidden layers, each having 16 neurons and sigmoid activation functions).

In some embodiments, for a given fatigue strength, the relevance vector machine (RVM) may predict the probability that the high frequency loads within a timeframe result in a timeframe damage that is greater than zero. If the relevance vector machine predicts that timeframe damage is greater than zero, then the artificial neural network (ANN) may detail the predicted non-zero value for timeframe damage further based on the given fatigue strength.

Consider the scenario in which timeframe duration is set to one second, and the dataset includes 15 different coefficients that were recorded at a rate of 10 Hz. In this scenario, the processing circuit may compute a basic feature vector by concatenating the recorded flight parameters. The resulting basic feature vector may have 150 dimensions which the processing circuit may subsequently reduce by using standard principle component analysis.

In some embodiments, the processing circuit may divide the dataset into first and second subsets. The processing circuit may train an artificial neural network regression model using the first subset, thereby generating a point prediction model. The processing circuit may then use the second subset to fit a prediction error distribution model (e.g., a heteroscedastic prediction error distribution model) by feeding the second subset to the point prediction model to generate point predictions, sorting these point predictions which are sometimes also referred to as samples according to magnitude, and fitting an error distribution through a predetermined number of sequential batches of samples which may overlap each other, if desired.

In certain embodiments, the processing circuit may perform the fitting process more than once. For example, the processing circuit may perform the fitting process once from the center of the sorted point predictions to the lower end and once again from the center of the sorted point predictions to the upper end.

In some scenarios, the fitting process may not converge. In these scenarios, the processing circuit may skip a batch and replace the associated error distribution by a neighboring error distribution. If desired, the processing circuit may associate each thus fitted error distribution to the mean of the point prediction values in the associated batch and assign future predictions to a batch (i.e. fitted error distribution) according to the minimum geometric distance to these mean values.

The processing circuit may fit different distribution types such as a Gaussian distribution, a Generalized Extreme Value distribution, a Gaussian distribution with dedicated Pareto tail models, a Gaussian kernel density function, just to name a few.

The processing circuit may store the thus generated database of probabilistic prediction models for timeframe maximum load, minimum load, and timeframe damage in a storage circuit. If desired, a fatigue life management system may use the database of probabilistic prediction models to determine the remaining fatigue life of the component.

FIG. 2 is a diagram of an illustrative fatigue life management system 200 for determining the remaining fatigue life of a component of an aircraft in accordance with an embodiment. As shown in FIG. 2, fatigue life management system 200 may include flight data recorder 210, processing circuits 220 and 250, and storage circuits 230 and 240.

Processing circuits 220 and 250 may include any circuitry that is suitable to process data signals. Such circuitry may include microprocessors, digital signal processors (DSP), microcontrollers, or other processing circuitry.

Storage circuits 230 and 240 may include any computer-readable medium. Such computer-readable media may include computer memory chips, removable and fixed media such as hard disk drives, flash memory, compact discs (CDs), digital versatile discs (DVDs), Blu-ray discs (BDs), other optical media, and floppy diskettes, tapes, or any other suitable memory or storage device(s). Storage circuits 230 and 240 may be implemented as random-access memory (RAM), read-only memory (ROM), or other addressable memory elements. If desired, storage circuits 230 and 240 and/or processing circuits 220 and 250 may be part of an integrated circuit.

Storage circuit 240 may store a database with regression models for probabilistic prediction of minimum load, maximum load, and timeframe damage of the component (e.g., the database of probabilistic prediction models that was generated using the processing circuit and the classification helicopter 101 of FIG. 1).

Flight data recorder 210 may have recorded the flight history of an aircraft. For example, flight data recorder 210 may continuously store flight data of previous flight parameters of the aircraft such as angle of attack, yaw rate, roll rate, pitch rate, roll attitude, pitch attitude, vertical acceleration, engine torque, collective position, rotor revolutions per minute, jet engine speed, wind speed over wings, load signals that are induced by the usage of the aircraft, etc.

Processing circuit 220 may receive the flight data from flight data recorder 210, select portions of the received flight data, and write the selected flight data to storage circuit 230 during a write access operation. For example, processing circuit 220 may remove recording sections that contain irrelevant events (e.g., periods during which the aircraft was idle on the ground). Processing circuit 220 may perform additional processing steps before storing the data in storage circuit 230, if desired. For example, processing circuit 220 may check the flight data for quality and repair damaged data, cut the flight data into non-overlapping subsequent timeframes (e.g., of a duration of one second), etc.

Processing circuit 250 may receive the selected flight data from storage circuit 230 and the database with regression models for probabilistic prediction of minimum load, maximum load, and timeframe damage of the component from storage circuit 240. If desired, a selector circuit may receive the regression models from the second storage circuit and select a predetermined regression model from the regression models.

In some embodiments, a sensor bias modeling circuit in processing circuit 250 may receive the selected flight data from the first storage circuit and model a random bias of the sensor based on a probabilistic flight data model. The sensor bias modeling circuit may use the random bias of the sensor to generate a variant of the selected flight data.

Processing circuit 250 may generate probability density functions of minimum load, maximum load, and timeframe damage for predetermined time intervals based on the variant of the selected flight data and the predetermined regression models.

In certain embodiments, processing circuit 250 may partition the selected flight data into timeframes of a predetermined duration. If desired, processing circuit 250 may then analyze the timeframes with probabilistic maximum load, minimum load, and timeframe damage prediction models to generate a time sequence of predicted distributions of maximum load, minimum load, and timeframe damage.

If desired, another processing circuit (not shown) may generate a probabilistic fatigue strength model for the variance of fatigue strength. This probabilistic fatigue strength model may use Bayesian statistics to incorporate prior knowledge and experience of the component's fatigue strength into the distribution model. The use of Bayesian statistics may allow to model random fatigue strength realistically and by an explicit distribution model, even when only few or no full-scale fatigue tests are available.

In some scenarios, the distribution of fatigue strength is modeled by a lognormal distribution, and this lognormal distribution may be estimated based on a small number of fatigue tests (e.g., less than 30 fatigue tests). In these scenarios, the parameters of the lognormal distribution (i.e., the mean and variance of the lognormal distribution) may be considered as random variables, too.

Processing circuit 250 may perform bootstrapping to simulate the additional source of uncertainty caused by the parameters of the lognormal distribution. By bootstrapping, many samples from the distribution of the parameters of the distribution of fatigue strength may be drawn.

If desired, processing circuit 250 may compute an accumulated fatigue damage estimation based on the probability density functions and the probabilistic fatigue strength model. Processing circuit 250 may determine an accumulated fatigue damage estimation several times (e.g., in a Monte Carlo simulation), thereby generating a distribution of the accumulated fatigue damage estimation of the component and the required quantile thereof.

Hence, bootstrapping may result in a simulated uncertainty distribution of the required quantile of total accumulated fatigue damage. A quantile of the uncertainty distribution of the quantile of accumulated fatigue strength may set the required confidence interval. As an example, the $10^{-6}$ quantile of accumulated fatigue damage may be estimated with single-sided 95% confidence.

Processing circuit 250 may input the probability density functions of minimum load, maximum load, and timeframe damage for predetermined time intervals and the probabilistic fatigue strength model to a simulation circuit that executes a simulation method where the distribution of the accumulated fatigue damage of the component is estimated with a comparatively high reliability. The simulation circuit may perform any simulation method. For example, the simulation circuit may perform a Monte Carlo simulation, a subset simulation, a molecular dynamics simulation, a sensitivity simulation, a bootstrap method, just to name a few.

To determine the remaining fatigue life of the component, processing circuit 250 may compare the distribution of the accumulated fatigue damage estimation with a reliability requirement. If desired, the reliability requirement may include a predetermined confidence level. Thus, processing circuit 250 may determine whether the remaining fatigue life of the component is exceeded and the component needs to be replaced.

Figure 3:
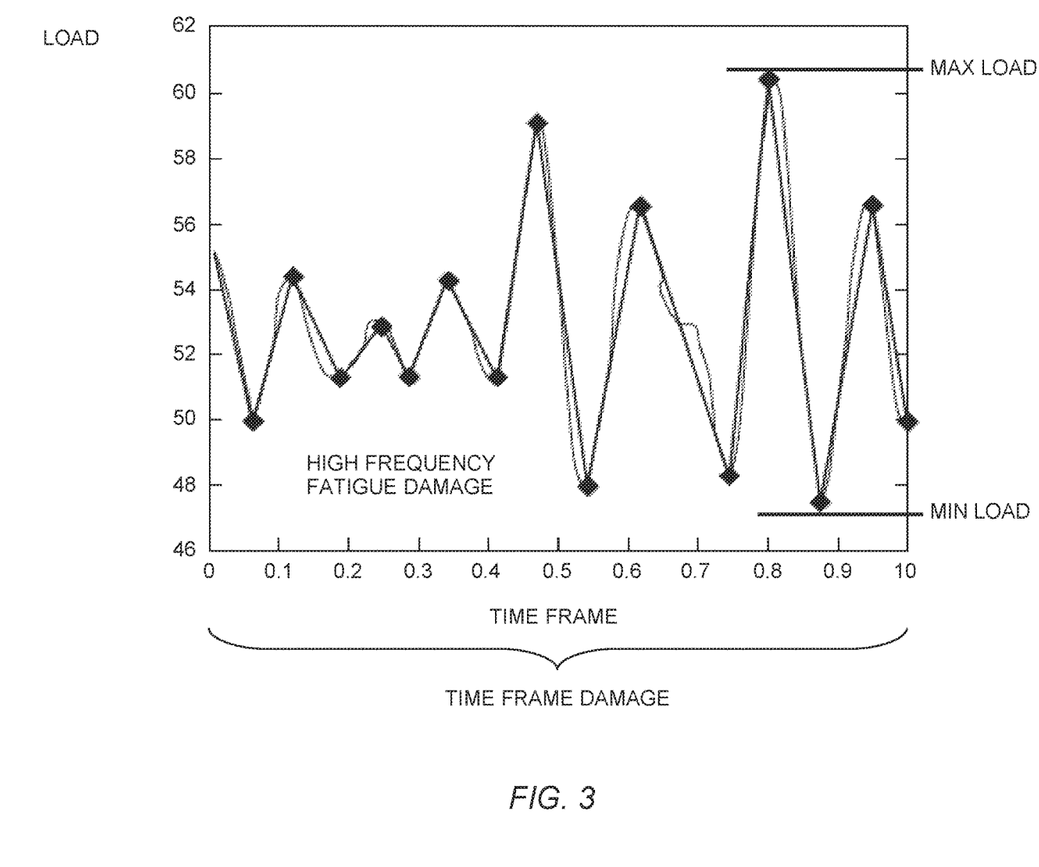
FIG. 3 is a diagram of an illustrative graph of high frequency component load signal processing in a fatigue life management system of the signals detected in FIG. 1 in accordance with an embodiment.

FIG. 3 is a diagram of an illustrative graph of high frequency component load signal processing in a fatigue life management system of the signals measured in FIG. 1 in accordance with an embodiment. In the example of FIG. 1, the component load signals indicating the torque at the tail rotor drive shaft 103 of tail boom 104 of FIG. 1 are recorded at a comparatively high frequency (e.g., a rate of at least 75 Hz).

The processing circuit of FIG. 1 may determine maximum component load data (MAX LOAD) together with the corresponding load classification flight parameters (e.g., the component being the tail rotor drive shaft 103, sampled at a low frequency of 20 Hz to 0.33 Hz). A plurality of heuristic models may correlate these load classification flight parameters with the corresponding maximum component loads to a dataset including the training of an artificial neural network.

If desired, the processing circuit of FIG. 1 may determine minimum component load data (MIN LOAD) together with the corresponding load classification flight parameters (e.g., the component being the tail rotor drive shaft 103, sampled at a low frequency of 20 Hz to 0.33 Hz). A plurality of heuristic models may correlate these flight parameters with the corresponding minimum component loads to a dataset by including the training of an artificial neural network.

In certain embodiments, the processing circuit of FIG. 1 may determine the high frequency equivalent timeframe fatigue damage data together with the corresponding load classification flight parameters (e.g., the component being the tail rotor drive shaft 103, sampled at a low frequency of 20 Hz to 0.33 Hz). A plurality of heuristic models may correlate these flight parameters with the corresponding high frequency equivalent timeframe fatigue damage to a dataset by including the training of an artificial neural network and/or a Relevance Vector Machine.

Figure 4:
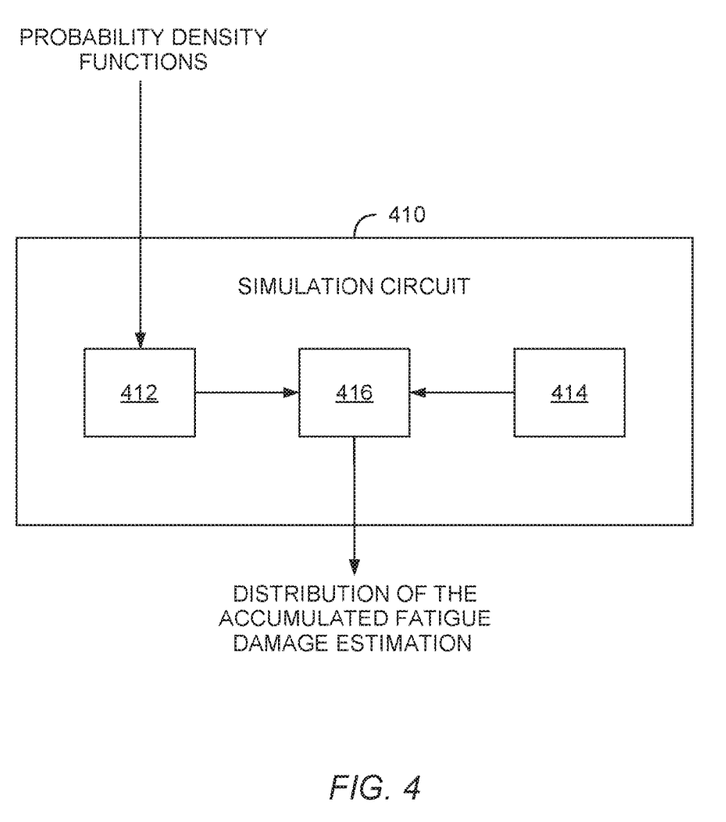
FIG. 4 is a diagram of an illustrative simulation circuit in a processing circuit of a fatigue life management system that determines a distribution of the accumulated fatigue damage estimation in accordance with an embodiment.

FIG. 4 is a diagram of an illustrative simulation circuit (e.g., simulation circuit 410) in a processing circuit (e.g., processing circuit 250 of FIG. 2) of a fatigue life management system that determines a distribution of the accumulated fatigue damage estimation in accordance with an embodiment. As shown, simulation circuit 410 may include simulation sub-circuits 412, 414, and 416.

Simulation sub-circuit 412 may receive probability density functions (e.g., probability density functions of minimum load, maximum load, and timeframe damage for predetermined time intervals generated by processing circuit 250 of FIG. 2) and determine a first data set of random samples by randomly sampling from at least a subset of the probability density functions.

If desired, a bootstrap simulation may model uncertainty in the probability density functions when drawing the first data set of random samples.

Simulation sub-circuit 414 may determine a second data set of fatigue strength samples by computing random realizations of fatigue strength based on a probabilistic fatigue strength model (e.g., the probabilistic fatigue strength model used by processing circuit 250 of FIG. 2).

Simulation sub-circuit 416 may compute an accumulated fatigue damage estimation based on the first and second data sets and use the accumulated fatigue damage estimation to generate the distribution of the accumulated fatigue damage estimation of the component. For example, simulation sub-circuit 416 may include a low-frequency fatigue damage estimator circuit that receives a random sample from the first data set of random samples from simulation sub-circuit 412 and a fatigue strength sample from the second data set of fatigue strength samples from simulation sub-circuit 414. Simulation sub-circuit 416 may determine an accumulated low-frequency fatigue damage by computing a load spectrum based on the random sample and computing fatigue damage based on the fatigue strength sample and the load spectrum. If desired, simulation circuit 410 may perform a Monte-Carlo simulation that estimates a required quantile of accumulated fatigue damage of the component.

Figure 5:
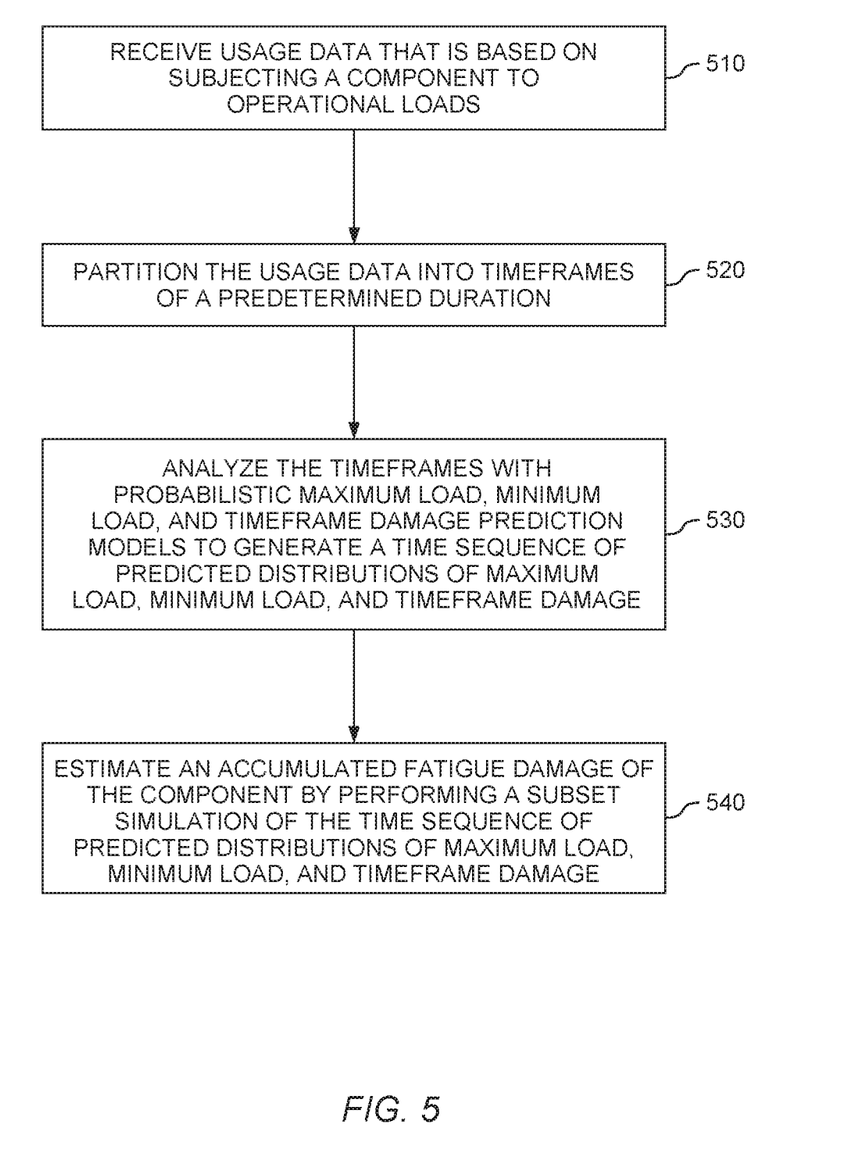
FIG. 5 is a diagram of a flow chart showing illustrative steps for operating a fatigue life monitoring system to estimate an accumulated fatigue damage of a component in accordance with an embodiment.

FIG. 5 is a diagram of a flow chart showing illustrative steps for operating a fatigue life monitoring system to estimate an accumulated fatigue damage of a component in accordance with an embodiment.

During step 510, the fatigue life monitoring system may receive usage data that is based on subjecting the component to operational loads. As an example, fatigue life management system 200 of FIG. 2 may read flight data recordings out of flight data recorder 210, process the flight data recordings with processing circuit 220, and store the processed flight data recordings as usage data in storage circuit 230.

During step 520, the fatigue life monitoring system may partition the usage data into timeframes of a predetermined duration. For example, processing circuit 250 of fatigue life management system 200 of FIG. 2 may read the usage data from storage circuit 230 and partition the usage data into timeframes of a predetermined duration.

During step 530, the fatigue life monitoring system (e.g., processing circuit 250 of fatigue life monitoring system 200 of FIG. 2) may analyze the timeframes with probabilistic maximum load, minimum load, and timeframe damage prediction models to generate a time sequence of predicted distributions of maximum load, minimum load, and timeframe damage.

During step 540, the fatigue life monitoring system (e.g., processing circuit 250 of fatigue life monitoring system 200 of FIG. 2) may estimate an accumulated fatigue damage of the component by performing a subset simulation of the time sequence of predicted distributions of maximum load, minimum load, and timeframe damage.

Figure 6:
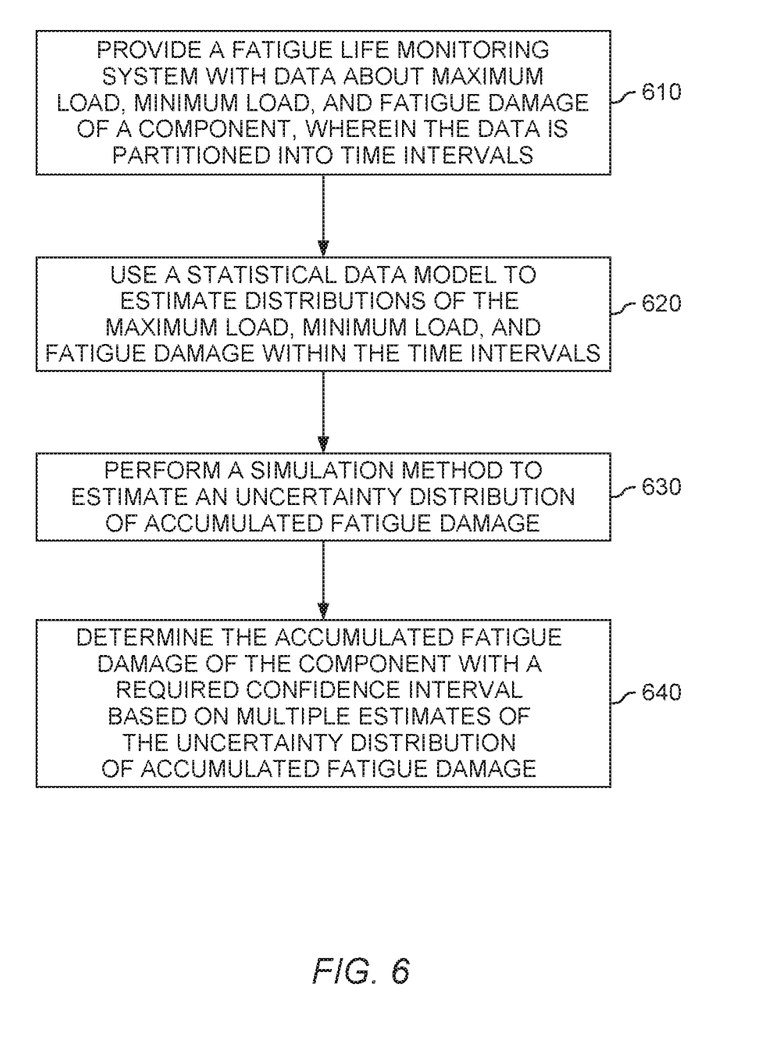
FIG. 6 is a diagram of a flow chart showing illustrative steps for performing probabilistic load and damage modeling in a fatigue life monitoring system that determines an accumulated fatigue damage of a component in accordance with an embodiment.

FIG. 6 is a diagram of a flow chart showing illustrative steps for performing probabilistic load and damage modeling in a fatigue life monitoring system that determines an accumulated fatigue damage of a component in accordance with an embodiment.

During step 610, the fatigue life monitoring system may be provided with data about maximum load, minimum load, and fatigue damage of the component, whereby the data is partitioned into time intervals, and the fatigue life monitoring system may use a statistical data model to estimate distributions of the maximum load, minimum load, and fatigue damage within the time intervals during step 620.

During step 630, the fatigue life monitoring system may perform a simulation method to estimate an uncertainty distribution of accumulated fatigue damage.

During step 640, the fatigue life monitoring system may determine the accumulated fatigue damage of the component with a required confidence interval based on multiple estimates of the uncertainty distribution of accumulated fatigue damage.

The method and apparatus described herein may be incorporated into any suitable electronic device or system of electronic devices. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), application specific standard products (ASSPs), application specific integrated circuits (ASICs), digital signal processing (DSP) circuits, just to name a few.

The device(s) in which the method and apparatus are incorporated may be part of a data processing system that includes one or more of the following components: a processor; memory; I/O circuitry; and peripheral devices.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A fatigue life management system for determining a remaining fatigue life of a component of an aircraft, the fatigue life management system comprising:

a flight data recorder that generates flight data recordings of the aircraft during the usage of the aircraft, the flight data recorder having a sensor coupled to the component, the sensor monitors the component while the component is being subjected to structural usage caused by operational loads during the usage of the aircraft to generate at least a subset of the flight data recordings;

a first processing circuit that receives the flight data of the aircraft from the flight data recorder and selects portions of the received flight data, the selected flight data of the aircraft including at least portions of the subset of flight data of the aircraft;

a first storage circuit that receives the selected flight data of the aircraft from the first processing circuit and stores the selected flight data of the aircraft;

a second storage circuit that stores regression models for probabilistic prediction of minimum load, maximum load, and timeframe damage of the component; and a second processing circuit that receives the selected flight data from the first storage circuit and the regression models from the second storage circuit, generates probability density functions of minimum load, maximum load, and timeframe damage for predetermined time intervals based on the selected flight data and the regression models, computes an accumulated fatigue damage estimation based on the probability density functions and a probabilistic fatigue strength model to generate a distribution of the accumulated fatigue damage estimation of the component, compares the distribution of the accumulated fatigue damage estimation with a reliability requirement to determine the remaining fatigue life of the component, and outputs an increased flight-hour-based interval between replacement of the component when the remaining fatigue life of the component is greater than a fatigue life of the component based on a fixed fatigue damage accumulation rate assumed by an original equipment manufacturer (OEM) of the aircraft and outputs a decreased flight-hour-based interval between replacement of the component when the remaining fatigue life of the component is less than the fatigue life of the component based on the fixed fatigue damage accumulation rate assumed by the OEM of the aircraft.

2. The fatigue life management system of claim 1 wherein:
the first processing circuit writes the selected flight data in the first storage circuit during a write access operation.

3. The fatigue life management system of claim 2, wherein the second processing circuit further comprises:
a sensor bias modeling circuit that receives the selected flight data from the first storage circuit, models a random bias of the sensor based on a probabilistic flight data model, and uses the random bias of the sensor to generate a variant of the selected flight data.

4. The fatigue life management system of claim 1, wherein the second processing circuit further comprises:
a selector circuit that receives the regression models from the second storage circuit and selects a predetermined regression model from the regression models.

5. The fatigue life management system of claim 1, wherein the second processing circuit further comprises:
a simulation circuit that implements a simulation method to compute the accumulated fatigue damage estimation.

6. The fatigue life management system of claim 5, wherein the simulation method is selected from the group consisting of Monte Carlo simulation, subset simulation, molecular dynamics simulation, sensitivity simulation, and bootstrap method.

7. The fatigue life management system of claim 5, wherein the simulation circuit further comprises:
a first simulation sub-circuit that receives the probability density functions from the second processing circuit and determines a first data set of random samples by randomly sampling from at least a subset of the probability density functions;
a second simulation sub-circuit that determines a second data set of fatigue strength samples by computing random realizations of fatigue strength based on a probabilistic fatigue strength model; and
a third simulation sub-circuit that computes an accumulated fatigue damage estimation based on the first and second data sets to generate the distribution of the accumulated fatigue damage estimation of the component.

8. The fatigue life management system of claim 7, wherein the third simulation sub-circuit further comprises:
a low-frequency fatigue damage estimator circuit that receives a random sample from the first data set of random samples from the first simulation sub-circuit and a fatigue strength sample from the second data set of fatigue strength samples from the second simulation sub-circuit and determines an accumulated low-frequency fatigue damage by computing a load spectrum based on the random sample and computing fatigue damage based on the fatigue strength sample and the load spectrum.

9. A method for determining a remaining fatigue life of a component of an aircraft, the method comprising:
subjecting the component to structural usage caused by operational loads during usage of the aircraft;
generating, by a flight data recorder, flight data recordings of the aircraft during the usage of the aircraft;
monitoring, by a sensor of the flight data recorder, the component while the component is being subjected to structural usage caused by operational loads during the usage of the aircraft and generating, by the sensor, at least a subset of the flight data recordings;
receiving, by a first processing circuit, the flight data of the aircraft from the flight data recorder and selecting, by the first processing circuit, portions of the received flight data, the selected flight data of the aircraft including at least portions of the subset of flight data of the aircraft;
receiving, by a first storage circuit, the selected flight data of the aircraft from the first processing circuit and storing, by the first storage circuit, the selected flight data of the aircraft;
storing, by a second storage circuit, regression models for probabilistic prediction of minimum load, maximum load, and timeframe damage of the component;
receiving, by a second processing circuit, the selected flight data from the first storage circuit and the regression models from the second storage circuit;
generating, by the second processing circuit, probability density functions of minimum load, maximum load, and timeframe damage for predetermined time intervals based on the selected flight data and the regression models;
computing, by the second processing circuit, an accumulated fatigue damage estimation based on the probability density functions and a probabilistic fatigue strength model to generate a distribution of the accumulated fatigue damage estimation of the component;
comparing, by the second processing circuit, the distribution of the accumulated fatigue damage estimation with a reliability requirement to determine the remaining fatigue life of the component;
outputting, by the second processing circuit, an increased flight-hour-based interval between replacement of the component when the remaining fatigue life of the component is greater than a fatigue life of the component based on a fixed fatigue damage accumulation rate assumed by an original equipment manufacturer (OEM) of the aircraft; and
outputting, by the second processing circuit, a decreased flight-hour-based interval between replacement of the component when the remaining fatigue life of the component is less than the fatigue life of the component based on the fixed fatigue damage accumulation rate assumed by the OEM of the aircraft.

10. An aircraft comprising:
a component that is subjected to structural usage by operational loads during usage of the aircraft;
a fatigue life management system for determining a remaining fatigue life of the component, the fatigue life management system including
a flight data recorder that generates flight data recordings of the aircraft during the usage of the aircraft, the flight data recorder having a sensor coupled to the component, the sensor monitors the component while the component is being subjected to structural usage caused by operational loads during the usage of the aircraft to generate at least a subset of the flight data recordings;

a first processing circuit that receives the flight data of the aircraft from the flight data recorder and selects portions of the received flight data, the selected flight data of the aircraft including at least portions of the subset of flight data of the aircraft;

a first storage circuit that receives the selected flight data of the aircraft from the first processing circuit and stores the selected flight data of the aircraft;

a second storage circuit that stores regression models for probabilistic prediction of minimum load, maximum load, and timeframe damage of the component; and a second processing circuit that receives the selected flight data from the first storage circuit and the regression models from the second storage circuit, generates probability density functions of minimum load, maximum load, and timeframe damage for predetermined time intervals based on the selected flight data and the regression models, computes an accumulated fatigue damage estimation based on the probability density functions and a probabilistic fatigue strength model to generate a distribution of the accumulated fatigue damage estimation of the component, compares the distribution of the accumulated fatigue damage estimation with a reliability requirement to determine the remaining fatigue life of the component, and outputs an increased flight-hour-based interval between replacement of the component when the remaining fatigue life of the component is greater than a fatigue life of the component based on a fixed fatigue damage accumulation rate assumed by an original equipment manufacturer (OEM) of the aircraft and outputs a decreased flight-hour-based interval between replacement of the component when the remaining fatigue life of the component is less than the fatigue life of the component based on the fixed fatigue damage accumulation rate assumed by the OEM of the aircraft.

* * * * *